United States Patent Office 3,455,973
Patented July 15, 1969

3,455,973
PROCESS FOR THE KETOLIZATION OF 17(20)-DOUBLE BONDS IN 3-KETO-$\Delta^{4,17(20)}$-21-HYDROXY STEROIDS OF THE PREGNANE SERIES
Ingemar B. Forsblad, Kalamazoo, Mich., assignor to The Upjohn Company, Kalamazoo, Mich., a corporation of Delaware
No Drawing. Filed June 7, 1967, Ser. No. 644,113
Int. Cl. C07c 169/34
U.S. Cl. 260—397.45    10 Claims

ABSTRACT OF THE DISCLOSURE

An improved process for the ketolization of 17(20)-double bonds in 3-keto $\Delta^{4,17(20)}$-21 hydroxy steroids of the pregnane series, having a protective ester or ether group at the 21-position, by means of an oxidizing agent and osmium tetroxide, in an inert organic solvent, whereby the corresponding 3,20-diketo-$\Delta^4$-17$\alpha$-hydroxy steroid product thus obtained is crystallized from solution during the reaction and whereby said product continues to crystallize during the remainder of the reaction to prevent further reaction and degradation of said product.

Summary of the invention

This invention relates to an improved process for the ketolization of 17(20)-double bonds in 3-keto-$\Delta^4$-steroids. The improved process of this invention provides consistently higher yields and fewer complications from side reactions than the prior art methods.

The ketolization of unsaturated steroids of the pregnane series with osmium tetroxide and certain oxidizing agents is known in the art. Prins and Reichstein, Helv. Chim. Acta, 25, 300 (1942) report that oxidation of a side chain unsaturated steroid with osmium tetroxide and chloric acid gives a hydroxy-keto steroid. Miescher and Schmidlin, Helv. Chim. Acta, 33, 1840 (1950) substituted hydrogen peroxide for the chloric acid as the oxidizing agent and U.S. Patent 2,668,816 disclosed that alkyl peroxides and peracids could be used also. U.S. Patent 2,769,823 discloses the use of a tertiary amine oxide peroxides as oxidizing agents and U.S. Patent 2,875,217 discloses organic polyvalent iodo oxides as oxidizing agents.

The prior art processes when applied to $\Delta^4$-3-keto steroids, especially on a commercial scale, cause undesirable degradation of the A-ring giving rise to lower yields of desired product. Degradation occurs for the most part at the 4(5)-double bond giving undesirable hydroxylation at both the 4 and 5-positions. These undesirable 4 and 5-hydroxylated derivatives are obtained in about a 5 to 15% yield based on the starting steroid and thus cause a concomitant loss in yield of desired product.

It has now been discovered that by means of the improved process of this invention, degradation of the A-ring can be significantly reduced, and that higher and more consistent yields and better quality of product can be obtained by carrying out the reaction in a manner whereby the desired 17,20-ketolized steroid product is crystallized from solution during the reaction and whereby the said 17,20-ketolized product continues to crystallize from solution as it is formed during the remainder of the reaction.

The 3,20-diketo-17$\alpha$-hydroxy-$\Delta^4$-steroids of the pregnane series which are produced by the improved process of this invention are known and valuable intermediates and are active adreno-cortical hormones, for example, cortisone acetate, hydrocortisone acetate, 6$\alpha$-methyl-hydrocortisone acetate, 6$\alpha$-fluoro-hydrocortisone acetate, prednisone acetate, prednisolone acetate, 6$\alpha$-methylprednisolone hemisuccinate, 6$\alpha$-fluoro-16$\alpha$-methylprednisolone acetate and the like.

Detailed description

The improved process of this invention is generally applicable to any $\Delta^4$-3-keto steroid of the pregnane series having the grouping =CH—CH$_2$OR in the 17 position, in which OR represents an esterified or etherified hydroxy group to obtain the corresponding 17$\alpha$-hydroxy-20-keto steroid. Steroid compounds which are especially useful as starting materials for the improved process of this invention are illustratively represented by the following structural formula:

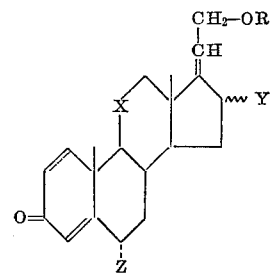

wherein OR is an esterified or etherified hydroxy group, in which R is the acyl radical of an organic carboxylic acid, preferably a hydrocarbon carboxylic acid of 1 to 12 carbon atoms, inclusive, such as formyl, acetyl, propionyl, butyryl, dimethylacetyl, trimethylacetyl, valeryl, hexanoyl, octanoyl, $\beta$-cyclopentylpropionyl, diethylacetyl, benzoyl, phenylacetyl, phenylpropionyl, succinoyl, phthaloyl and the like; a hydrocarbon radical of 1 to 12 carbon atoms, for example, alkyl, methyl, ethyl, propyl, butyl, hexyl, octyl, decyl, dodecyl, and isomeric forms thereof; aryl, such as phenyl, tolyl, xylyl and naphthyl; aralkyl, such as benzyl and trityl; heterocyclic, such as tetrahydropyranyl and tetrahydrofuranyl; and the like; X is methylene, $\beta$-hydroxymethylene, $\alpha$-hydroxymethylene or carbonyl; Y is hydrogen or methyl, Z is hydrogen, methyl or fluorine; the dotted line between the 1 and 2 carbon atoms represents the presence of a single bond or a double bond, and the wavy line ($\int$) at the 16-position represents the $\alpha$-configuration, the $\beta$-configuration or mixture thereof.

In carrying out the improved process of this invention, the selected $\Delta^{4,17(20)}$-3-keto steroid is dissolved in tertiary butyl alcohol and reacted with osmium tetroxide and a suitable oxidizing agent to obtain the corresponding $\Delta^4$-3,20-diketo-17$\alpha$-hydroxy steroid. The process of the present invention differs from the prior art processes in that the reaction is carried out in a manner whereby undesirable side reactions are significantly reduced. The improved process of this invention comprises: (1) carrying out the ketolization at a temperature within the range of from about 20° C. to about 35° C., about 25–30° C. is generally preferred, until a substantial amount, at least 25% and not more than 50%, of the desired 3,20-diketo-$\Delta^4$-17$\alpha$-hydroxy steroid product is obtained; (2) cooling the reaction mixture to or below the freezing point of the reaction mixture, so as to freeze a sufficient proportion of the said reaction mixture whereby the concentration of the desired 3,20-diketo-$\Delta^4$-17$\alpha$-hydroxy steroid product is raised to the point of crystallization; (3) allowing a major proportion of the desired product to crystallize from solution; and (4) continuing the ketolization reaction at a temperature below that of redissolution of the crystallized product and at a temperature at which additional 3,20-diketo-$\Delta^4$-17$\alpha$-hydroxy steroid product thus obtained will continue to precipitate as formed.

The temperature necessary to freeze the reaction mixture will be below 25.5° C., the freezing point of tertiary butyl alcohol, and will necessarily depend on the nature and concentration of unreacted starting material, the concentration of desired produce, and the particular oxidizing agent employed in the reaction. A temperature range of from about −5° C. to +17° C. can normally be employed to freeze the reaction mixture and cause the product to crystallize from solution, a temperature within the range of about 5 to 14° C. has been found to be generally advantageous. The reaction is then continued at a temperature at which the product does not substantially redissolve and at which the reaction will proceed at a reasonable rate. Temperatures at or near the initial freezing point of the reaction mixture have been found to be especially advantageous. Slightly higher temperatures can be employed without a significant detrimental effect on the improved yield and somewhat lower temperatures can be employed without significantly increasing the reaction time.

Tertiary butyl alcohol is the preferred solvent for the reaction, other solvents such as water, chloroform, pyridine and the like can be added in small quantities to lower the freezing point of the reaction mixture without detrimental effect to the improved yields. In fact the presence of pyridine or a like aromatic amine results in a speedier reaction.

The amount of osmium tetroxide employed in the reaction can be varied widely, for example, from 0.2 molar equivalent to 0.0005 molar equivalent. Advantageously, however, not more than 0.05 molar equivalent is used. When the amount of osmium tetroxide employed is between 0.001 and 0.05 molar equivalents, it is possible to obtain high yields of desired product and to remove the residual osmium tetroxide with ease, e.g., by treating the reaction mixture with sodium hydrosulfite.

Suitable oxidizing agents which can be employed are tertiary amine oxide hydrogen peroxide complexes, preferably, organic carboxylic aryl polyvalent iodo oxides, alkyl peroxides, hydrogen peroxide and mixtures thereof. The tertiary amine oxide peroxides useful in the practice of this invention are disclosed in U.S. Patent 2,769,823, of these, the ones which are non-aromatic, are preferred, such as, N-alkyl cycloalkylamine oxide peroxides, e.g., N-alkylmorpholine oxide peroxide, N - alkylpyrrolidine oxide peroxides and N-alkylpiperidine oxide peroxides, the trialkylamine oxide peroxides, e.g. trimethylamine oxide peroxide, triethylamine oxide peroxide, methyldiethylamine oxide peroxide, ethyldimethylamine oxide peroxide, etc. Of these amine oxide peroxides, triethylamine oxide peroxide and N-methylmorpholine oxide peroxide are especially advantageous. The polyvalent iodo oxides useful in the practice of this invention are disclosed in U.S. Patent 2,875,217, of these the aryl iodoso compounds such as iodosobenzene and phenyliodosoacetate are preferred. The alkyl peroxides useful in the process of the invention are preferably those wherein the alkyl radical contains from 1 to 12 carbon atoms, inclusive, such as those radicals hereinbefore named.

The amount of oxidizing agent or agents theoretically required to produce a 17-hydroxy-20-keto steroid is two oxidation equivalents. It has been found, however, that in the improved process of this invention, somewhat more than the theoretical amount of oxidizing agent is necessary to obtain a complete reaction. For example, optimum results are ordinarily obtained using between about 2.2 and about 2.75 oxidation equivalents of the oxidizing agent, about 2.5 equivalents is generally preferred.

The manner in which the oxidizing agent is added to the steroid osmium tetroxide mixture is not critical, it can be added all at once at the beginning of the reaction, slowly over the entire reaction period or it can be added in several portions during the reaction period, such as a predetermined portion calculated on the amount of product desired to be produced prior to freezing the reaction mixture, and then adding the remaining portion of the oxidizing agent continuously over the remaining reaction period, all at once after the initial crystallization or in batchwise portions.

The following examples further illustrate the process of this invention but are not to be construed as limiting.

Example 1.—Hydrocortisone acetate

To a solution of 30 g. of 11β,21-dihydroxy-4,17(20)-cispregnadien-3-one, 21-acetate in 1060 ml. of tertiary butyl alcohol and 15.5 ml. of pyridine was added 12.5 mg. of osmium tetroxide in 3 ml. of tertiary butylalcohol, the temperature was adjusted to 30° C. and 71 ml. of a 4.74 molar solution of N-methyl morpholine N-oxide hydrogen peroxide complex (N-methyl-morpholine oxide peroxide) in tertiary butanol was added. The reaction mixture was seeded with a small amount of hydrocortisone acetate and stirred for about 12 hours at about 30° C. The mixture was then cooled down to its freezing point, 10–17° C. for about 6 hrs. A major proportion of the hydrocortisone acetate crystallized out during this period. The temperature was then raised to 15° C. during the remainder of the reaction. An additional 18 ml. of the N-methylmorpholine oxide peroxide was added 18 hrs. from the start of the reaction, and the reaction was continued at about 15° C. for an additional period of about 27 hours. The reaction was then interrupted by adding 2 g. of sodium hydrosulfite dissolved in 312 ml. of $H_2O$. The mixture was concentrated to 500 ml. under reduced pressure and 1030 ml. of $H_2O$ was added. The precipitated product was filtered and dried to give 25.6 g. (78.4% yield) of crude hydrocortisone acetate. The hydrocortisone acetate thus obtained was triturated with methylene chloride to give 23.6 g. (72.2% yield) of hydrocortisone acetate, $$[\alpha]_{dioxane}^{1\%} + 160°$$

Example 2.—Hydrocortisone acetate

To a solution of 30 g. of 11β,21-dihydroxy-4,17(20)-cis-pregnadien-3-one, 21-acetate in 915 ml. of tertiary butyl alcohol and 15.5 ml. of pyridine was added 12.5 mg. of osmium tetroxide in 3 ml. of tertiary butyl alcohol, the temperature was adjusted to 30° C. and 8.75 ml. of 4.74 molar N-methyl-morpholine oxide peroxide and 5 ml. of 50% hydrogen peroxide was added. The reaction mixture was stirred for about 2 hours at about 30° C and an additional 3 ml. of hydrogen peroxide was added. Stirring was then continued for an additional 3 hours at about 30° C. and then 3.5 ml. more of hydrogen peroxide was added. The reaction mixture was seeded with a small amount of hydrocortisone acetate and stirred for an additional 6.5 hours at about 30° C. The mixture was then cooled down to its freezing point, about 15° C., and stirring was continued for an additional 1 hour period. A major proportion of the hydrocortisone acetate crystallized out during this period. The temperature was then raised to 17° C. and the reaction was allowed to continue for about 48 hours from the start of the reaction. The product was recovered from the reaction mixture and purified in the manner disclosed in Example 1, above, to give 22.3 g. (68.2% yield) of hydrocortisone acetate, $$[\alpha]_{dioxane}^{1\%} + 161°$$

Example 3.—Hydrocortisone acetate

To a solution of 150 parts of 11β,21-dihydroxy-4,17 (20)-cis-pregnadien-3-one 21-acetate in 4700 parts of tertiary butyl alcohol and 78 parts of pyridine was added 0.18 parts of osmium tetroxide. The temperature was adjusted to about 35° C. The total amount of N-methylmorpholine oxide peroxide to be used, 2.5 molar equivalents based on the starting steroid, was calculated. Following the osmium tetroxide adition, 27% of the total calculated amount of N-methylmorpholine oxide peroxide was added while stirring, and cooling was continued until the temperature reached about 25° C. After 15 minutes from the start of the reaction an additional 20% of the total calculated amount of N-methylmorpholine oxide peroxide was added, followed by an additional 15% of the N-methylmorpholine oxide peroxide after 45 minutes from the start of the reaction and then by an additional 10% after 1.75 hrs. from the start. The reaction was then allowed to continue with stirring at about 25° C. for a total period of about 4 hours from the first N-methylmorpholine oxide peroxide addition, or until a 10 ml. sample of the reaction mixture required less than 8 ml. of 0.1 N sodium thiosulfate to titrate the excess N-methylmorpholine oxide peroxide present. Cooling was then started and the reaction mixture was seeded with about 0.005 part of hydrocortisone acetate. Cooling was continued and the temperature was adjusted at a few degrees below the freezing point of the reaction mixture, or about 10–12° C., stirring was continued for about 1 hour, and then the remaining N-methylmorpholine oxide peroxide was added to the reaction mixture continuously over about a 10 hour period keeping the temperature at about 10–12° C. After all of the N-methylmorpholine oxide peroxide had been added the reaction was allowed to continue for an additional period of about 10 hours or until colorimetricbromination analysis showed only about 3 to 5% of unreacted starting steroid remained in the reaction mixture.

The reaction mixture was then treated with 10 parts of activated charcoal; 10 parts of sodium hydrosulfite and 720 parts of deionized water, allowed to stir for ½ hour at about 60° C. to solubilize the steroid and then filtered. The filtrate was concentrated under reduced pressure at about 30 to 35° C., to a volume corresponding to about 2400 parts of water. The concentrated reaction mixture was then diluted with about 5200 parts of deionized water and cooled to 10–12° C. for about 13 to 15 hours. The precipitate thus obtained was collected by filtration, washed with deionized water and dried. The dried hydrocortisone acetate thus obtained was then triturated with methylene chloride to give an average yield of 70.6% of purified hydrocortisone acetate, M.P. 216–220° C.

$$[\alpha]_{dioxane}^{1\%} + 162°$$

The above yield is based on the starting material actually converted to hydrocortisone acetate since the unreacted starting material can be recovered from the methylene chloride solution and reused.

In the same manner, following the procedure of Examples 1, 2, or 3, above, other 3-keto-$\Delta^{4,17(20)}$-21-hydroxy compounds of the pregnane series which are protected at the 21-position by an ester or ether group can likewise be converted in improved yields to the corresponding 3,20-diketo-$\Delta^4$-17α-hydroxy steroids, for example:

21 - hydroxy-4,17(20)-cis-pregnadien-3,11-dione 21-acetate to cortisone acetate;

6α - methyl-11β,21-dihydroxy-4,17(20)-cis-pregnadien-3-one 21-tetrahydropyranyl ether to 6α-methyl hydrocortisone tetrahydropyranyl ether;

6α - methyl-11β,21-dihydroxy-4,17(20)-cis-pregnadien-3-one 21-propionate to 6α-fluorohydrocortisone propionate;

21 - hydroxy-1,4,17(20)-cis-pregnatriene-3,11-dione 21-acetate to prednisone acetate;

11β-21-dihydroxy-1,4,17(20)-cis-pregnatrien-3-one 21-acetate to prednisolone acetate;

6α - fluoro-16α-methyl - 11β-21-dihydroxy-1,4,17(20)-cis-pregnatrien-3-one 21-acetate to 6α-fluoro-16α-methyl-prednisolone acetate;

6α - methyl-11β,21-dihydroxy-1,4,17(20)-cis-pregnatrien-3-one 21-hemisuccinate to 6α-methylprednisolone hemisuccinate;

21-hydroxy-4,17(20)-cis-pregnadien-3-one 21-acetate to 17α-21-dihydroxy-4-pregnene-3,20-dione 21-acetate; and the like.

The corresponding trans compounds or mixtures of cis and trans can likewise be converted to the corresponding 17α-hydroxy 20-keto steroids in improved yields.

In the same manner, following the procedure of Examples 1, 2 and 3, above, equivalent amounts of the other oxidizing agents hereinbefore named, or mixtures thereof, can be substituted in place of the N-methylmorpholine oxide peroxide and hydrogen peroxide to obtain an improved yield of the desired 17α-hydroxy-20-keto steroids.

I claim:

1. In the process for the ketolization of 17(20)-double bonds in 3-keto-$\Delta^{4,17(20)}$-21-hydroxy steroids of the pregnane series, protected at the 21-position by an ester or ether group, in an inert organic solvent by means of osmium tetroxide and an oxidizing agent to obtain the corresponding 3,20-diketo-$\Delta^4$-17α-hydroxy steroid product, the improvement which comprises: (1) carrying out the reaction at a temperature within the range of from 20 to 35° C., until a substantial amount of the corresponding 3,20-diketo-$\Delta^4$-17α-hydroxy steroid product is obtained, (2) cooling the reaction mixture to or below its freezing point, (3) allowing a major proportion of the 3,20-diketo-$\Delta^4$-17α-hydroxy steroid product to crystallize from solution, and (4) continuing the ketolization reaction at a temperature below that of redissolution of the crystallized product and at a temperature at which additional 3,20-diketo-$\Delta^4$-17α-hydroxy steroid product thus obtained will continue to crystallize from solution as it is produced.

2. An improved process for the production of 3,20-diketo-$\Delta^4$-17α-hydroxy steroids which comprises: (1) reacting a 3-keto-$\Delta^{4,17(20)}$-steroid of the formula:

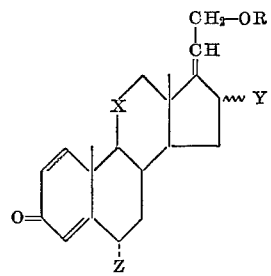

wherein OR is an esterified or etherified hydroxy group, in which R is the acyl radical of a hydrocarbon carboxylic acid of 1 to 12 carbon atoms, inclusive, or a hydrocarbon radical of 1 to 12 carbons, inclusive; X is methylene, β-hydroxymethylene, α-hydroxymethylene or carbonyl; Y is hydrogen or methyl; Z is hydrogen, methyl or fluorine; the dotted line appearing between the 1 and 2 carbon atoms represents the presence of a single bond or a double bond; and the wavy line (∫) at the 16-position represents the α-configuration, the β-configuration or mixtures thereof, with osmium tetroxide and an oxidizing agent in tertiary butyl alcohol at a temperature within the range of 20 to 35° C. until a substantial amount of the corresponding 3,20-diketo-$\Delta^4$-17α-hydroxy steroid product is obtained, (2) cooling the reaction mixture to or slightly below its freezing point, (3) allowing a major proportion of the 3,20-diketo-$\Delta^4$-17α-hydroxy steriod product to crystallize from solution, and (4) continuing the ketolization reaction at a temperature below that of redissolution of the crystallized product and at a temperature at which additional 3,20-diketo-$\Delta^4$-17α-hydroxy steroid product thus obtained will continue to crystallize from solution as it is produced.

3. The process of claim 2, wherein the oxidizing agent is an amine oxide peroxide.

4. The process of claim 2, wherein the oxidizing agent is N-methylmorpholine oxide peroxide.

5. The process of claim 2, wherein the oxidizing agent is hydrogen peroxide.

6. The process of claim 2, wherein the oxidizing agent is a mixture of an amine oxide peroxide and hydrogen peroxide.

7. The process of claim 2, wherein the oxidizing agent is a mixture of N-methylmorpholine oxide peroxide and hydrogen peroxide.

8. The process of claim 2, wherein the starting steroid is 11β,21-dihydroxy-4,17(20-pregnadien-3-one 21-acetate, the oxidizing agent is N-methylmorpholine oxide peroxide and the product obtained is hydrocortisone acetate.

9. The process of claim 2, wherein the starting steroid is 11β,21-dihydroxy-4,17(20)-pregnadien-3-one 21-acetate, the oxidizing agent is a mixture of N-methylmorpholine oxide peroxide and hydrogen peroxide and the product obtained is hydrocortisone acetate.

10. The process of claim 2, wherein the starting steroid is 11β,21-dihydroxy-4-17(20)-pregnadien-3-one 21-acetate, the oxidizing agent is hydrogen peroxide and the product obtained is hydrocortisone acetate.

No references cited.

ELBERT L. ROBERTS, Primary Examiner

U.S. Cl. X.R.

260—397.47